United States Patent [19]

Watanabe et al.

[11] Patent Number: 5,432,664
[45] Date of Patent: Jul. 11, 1995

[54] HEAD SUPPORTING DEVICE PRODUCING A NEGATIVE PRESSURE

[75] Inventors: Yoshitaka Watanabe; Atsushi Namba, both of Kanagawa, Japan

[73] Assignee: Canon Kabushiki Kaisha, Tokyo, Japan

[21] Appl. No.: 324,376

[22] Filed: Oct. 17, 1994

Related U.S. Application Data

[63] Continuation of Ser. No. 198,400, Feb. 18, 1994, abandoned, which is a continuation of Ser. No. 842,436, Feb. 27, 1992, abandoned.

[30] Foreign Application Priority Data

Mar. 4, 1991 [JP] Japan .................. 3-037421
Oct. 31, 1991 [JP] Japan .................. 3-286441

[51] Int. Cl.[6] .............................. G11B 5/48
[52] U.S. Cl. .............................. 360/130.34
[58] Field of Search ............... 360/130.34, 128, 104

[56] References Cited

U.S. PATENT DOCUMENTS

| 4,833,556 | 5/1989 | Kosarko et al. | 360/130.34 |
| 5,036,415 | 7/1991 | Nagamori et al. | 360/130.34 |
| 5,047,884 | 9/1991 | Negishi et al. | 360/130.34 |

Primary Examiner—Robert S. Tupper
Attorney, Agent, or Firm—Robin, Blecker, Daley & Driscoll

[57] ABSTRACT

In a head supporting device arranged to surround a head, to include a first projecting strip part which protrudes on one side of the device facing a sheet-shaped recording medium and a second projecting strip part which is formed on the outer side of the first projecting strip part with a spacing part interposed between the first and second projecting strip parts and to suck the recording medium with negative pressure, the sliding-contact faces of the first and second projecting strip parts are formed to be slanting upward toward the head, and a sectional shape of each of the projecting strip parts is composed of an approximately straight line which is on the recording-medium-facing side and a plurality of arcs which continue respectively from the two ends of the approximately straight line.

24 Claims, 8 Drawing Sheets

SMALL — LARGE
CONTACT FORCE

HEAD SUPPORTING DEVICE PRODUCING A NEGATIVE PRESSURE

CROSS REFERENCE TO RELATED APPLICATION

This application is a continuation of application Ser. No. 08/198,400, filed Feb. 18, 1994, now abandoned, which is a continuation of application Ser. No. 07/842,436, filed Feb. 27, 1992, now abandoned.

BACKGROUND OF THE INVENTION

1. Field of the Invention

This invention relates to a recording or reproducing apparatus, and more particularly to a stabilizing member which is arranged to stabilize the abutting state of a head on a recording medium.

2. Description of the Related Art

Recording or reproducing apparatuses of the kind arranged to perform recording or reproduction on or from a sheet-shaped recording medium such as a flexible magnetic disc or the like have been known.

The apparatus of this kind uses a head supporting device (hereinafter referred to as a pad) which is arranged to generate fluidic pressure through the travel of the magnetic sheet to push the magnetic sheet against the head for stable contact of the magnetic sheet with the magnetic head while the sheet is traveling.

Generally, the pad is arranged to be in a shape as shown in FIGS. 1(a) and 1(b) of the accompanying drawings. Referring to these figures, the pad 100 is disposed around the magnetic head 4. A flat part 104 of the pad 100 has a slot 108 arranged in its middle part on one side of the pad 100 facing the magnetic sheet 3 (see FIG. 2) to allow the magnetic head 4 to pass therethrough. Projecting strip parts 101 and 103 are formed in concentric circular shapes to protrude to a given height from the flat part 104 and are spaced at a given distance through an annular groove part 102 around the periphery of the flat part 104. The projecting strip parts 101 and 103 are provided with cutout parts 105 and 106. These cutout parts 105 and 106 are arranged on a downstream side D of the movement of the magnetic sheet 3, in the direction of arrow A, to eject an air stream generated by the rotation of the magnetic sheet 3 in such a way as to control negative pressure brought forth by the pad 100.

The sheet sliding-contact faces 101a and 103a of the projecting strip parts 101 and 103 of the pad 100 are in a flat shape. With the pad 100 disposed around the magnetic head 4 in the above-stated manner, when the magnetic sheet 3 is caused to rotate, a stream of air takes place between the pad 100 and the magnetic sheet 3 to bring forth a negative pressure which sucks the magnetic sheet 3. FIG. 8(b) shows the results of fluidic analysis of the distribution of pressure between the pad 100 and the magnetic sheet 3. In the case of FIG. 8(b), the distribution of pressure is taken along a line B—B shown in FIG. 1(a). The points P1 to P8 of FIG. 8(b) correspond to points P1 to P8 of FIG. 1(a). Further, the planar distribution of a contact force between the pad 100 and the magnetic sheet 3 is as shown in FIG. 4(b).

In the case of the conventional device described above, the upper faces 101a and 103a of the projecting strip parts 101 and 103 are formed approximately on the same plane. Therefore, when the magnetic sheet 3 is sucked by the pad 100 into contact with the head 4, the distribution of the contact force which is as shown in FIG. 4(b) causes the magnetic sheet 3 to come into contact with the sliding-contact faces 101a and 103a of the pad 100 in a greatly partial manner. The partial contact then tends to damage the magnetic sheet 3 or to cause fluctuations in the negative pressure on a spindle motor, uneven rotation, jitters and so on.

Further, macroscopically considered, the force of sucking is weak on the downstream side D of the head 4 in the rotating direction of the magnetic sheet 3 to cause the deformation of the magnetic sheet 3 to become asymmetric relative to the head 4 as shown in FIG. 5(b). Under such a condition, the head 4 comes into strong contact with the magnetic sheet 3 on its upstream side U to result in a partial abrasion of the head 4.

The conventional device has presented another problem: since the magnetic sheet 3 is sucked by the negative pressure which is brought forth by the groove part 102, the magnetic sheet 3 is deformed, considering it microscopically, at the projecting strip parts 101 and 103 as shown in FIG. 9(b). The magnetic sheet 3 thus comes into contact with the edges 101b and 103b of the projecting strip parts 101 and 103. This condition not only tends to cause the magnetic sheet 3 to be damaged by the pad 100 but also might hinder recording or reproduction.

SUMMARY OF THE INVENTION

It is an object of this invention to provide a recording or reproducing apparatus or a head supporting device which is arranged to adequately bring a magnetic head into contact with a sheet-shaped magnetic recording medium without damaging the recording medium by lessening a sliding contact resistance between them.

To attain this object, a head supporting device which is arranged as an embodiment of this invention to surround a head, to have, on one side thereof facing a sheet-shaped recording medium, a first projecting strip part protruding toward the recording medium and a second projecting strip part protruding toward the recording medium and located outside the first projecting strip part, with a spacing interval part interposed between the first and second projecting strip parts, and to suck the recording medium with a negative pressure, is formed such that sliding-contact faces of the first and second projecting strip parts which come into sliding contact with the recording medium are formed to be slanting upward toward the head. Further, the sectional shape of each of the projecting strip parts consists of an approximately straight line which is on the side facing the recording medium and a plurality of circular arcs which continue from the two ends of the approximately straight line.

Further, the above-stated head supporting device is arranged in a recording or reproducing apparatus of the kind moving the head relative to the recording medium.

The above and other objects and features of the invention will become apparent from the following detailed description of embodiments thereof taken in conjunction with the accompanying drawings.

DETAILED DESCRIPTION OF THE PREFERRED EMBODIMENTS

Figure 1A:
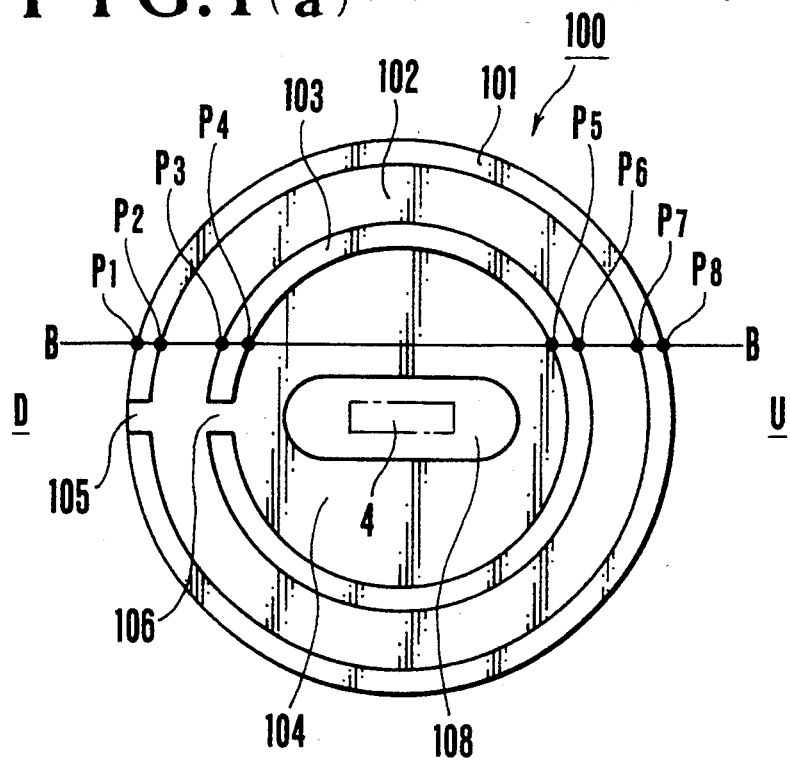
FIGS. 1(a) and 1(b) are a plan view and a sectional view showing by way of example the conventional pad.
Figure 1B:
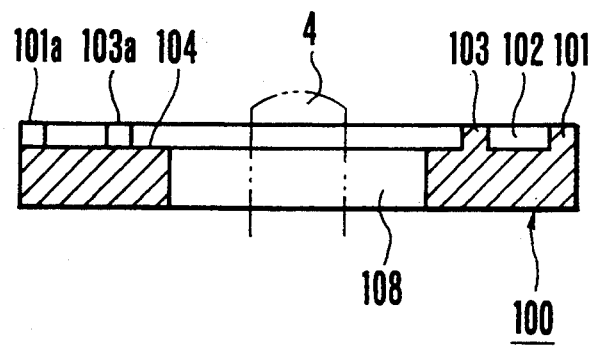
Figure 2:
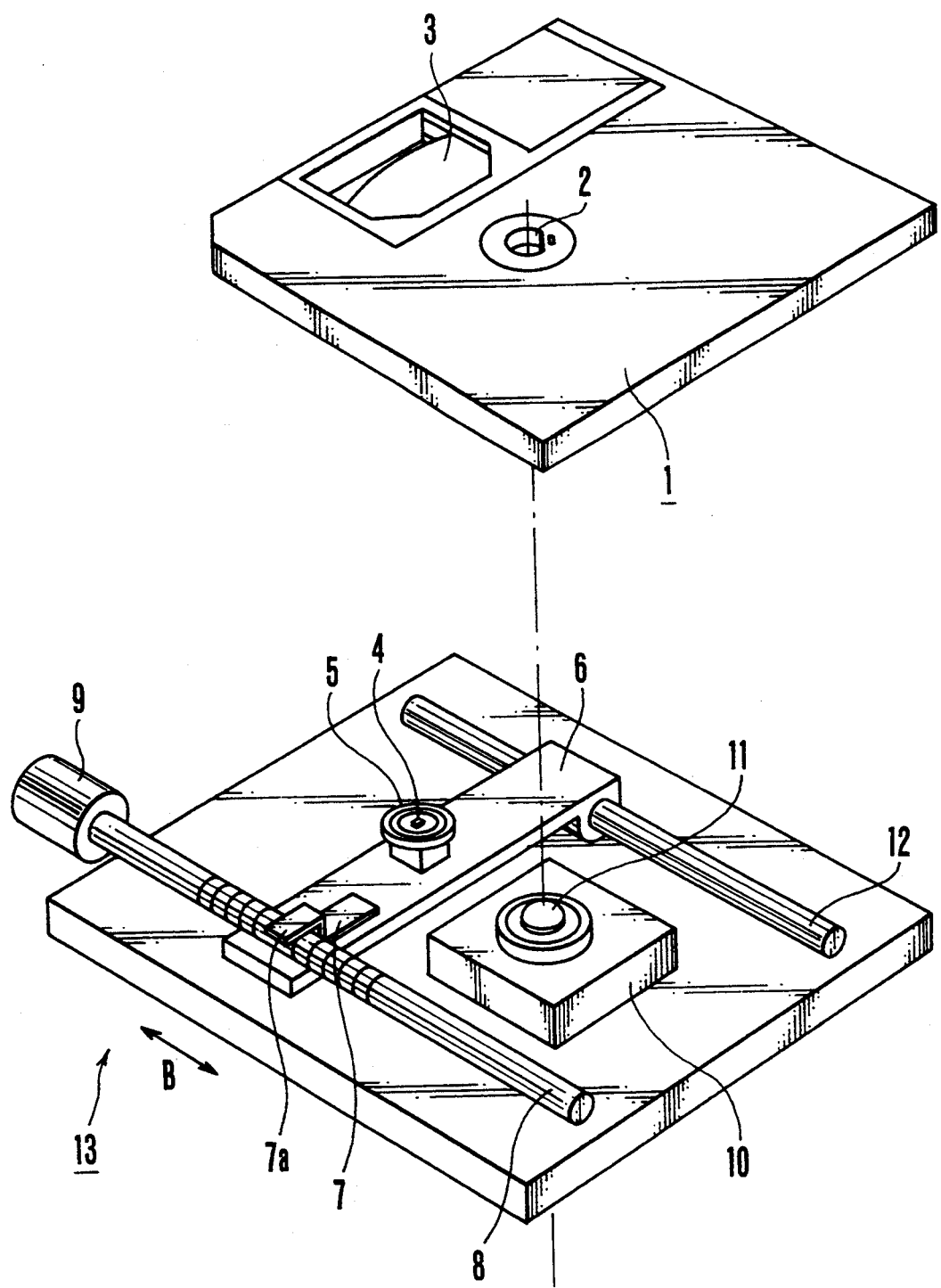
FIG. 2 is an oblique view showing a disc (or sheet) driving device to which this invention is applied as an embodiment thereof.

The following describes in detail, with reference to the drawings, a recording or reproducing apparatus and a head supporting device embodying this invention:

FIG. 2 shows in an oblique view the recording or reproducing apparatus embodying this invention. Referring to FIG. 2, a magnetic sheet 3 for recording (hereinafter referred to as the sheet) is rotatably stowed in a disc jacket 1. The sheet 3 has a center core 2 arranged in the middle part of the sheet 3 to be securely set on a spindle mounted on the rotation shaft of a spindle motor 10.

A disc driving device 13 is arranged to drive and rotate the sheet 3 disposed within the disc jacket 1. The disc driving device 13 is provided with a magnetic recording or reproducing head 4 (hereinafter referred to as the head) and a pad 5 which is arranged around the head 4 to generate a sucking force (negative pressure) by the rotation of the sheet 3, as will be described in detail later. The head 4 and the pad 5 are secured by an adhesive to a head carriage 6 which is arranged to move the head 4.

The head carriage 6 has an engaging part 7a of an elastic member 7 secured to one end thereof and is engaged by the engaging part 7a with a head moving mechanism which consists of a stepping motor 9 and a lead screw 8. The other end of the head carriage 6 is carried by a guide bar 12 in such a way as to be axially slidable on the guide bar 12. The head carriage 6 is thus arranged to be radially moved over the sheet 3 in the direction of arrow B to a given extent at a time. In FIG. 2, parts supporting the motor 9, the lead screw 8 and the guide bar 12 are omitted from the illustration.

A spindle motor 10 is arranged to rotate the sheet 3 and has a chucking part 11 which is arranged to hold the center core 2 of the sheet 3. The sheet 3 is held by the chucking part 11 in such a way as to be freely detachable when the disc jacket 1 is demounted from the apparatus by a known means. When the sheet 3 is rotated by the motor 10, the sheet 3 is sucked toward the pad 5 by a fluidic action of an air stream taking place between the sheet 3 and the pad 5. With the sheet 3 thus sucked, the sheet 3 comes into pressed contact with the head 4 to give an adequate touch of the head 4 on the sheet 3.

Figure 3:
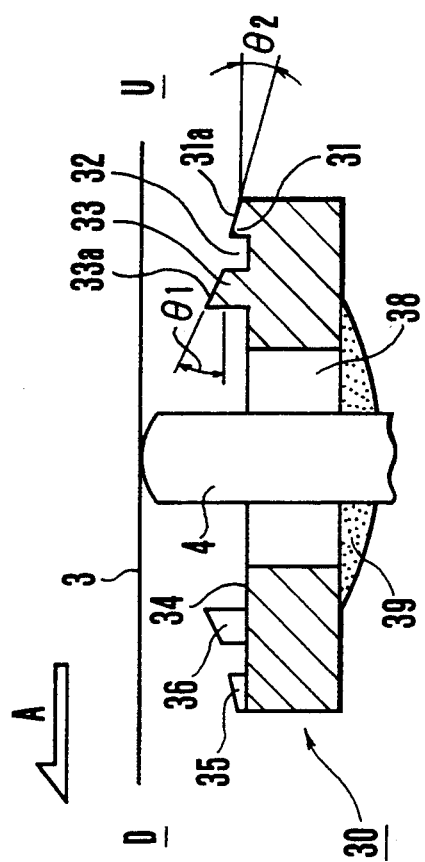
FIG. 3 is a sectional view showing an embodiment of the invention.

FIG. 3 is a sectional view showing by way of example a pad arranged in accordance with this invention. The pad 30 is in a circular disc-like shape. The pad 30 comprises a first projecting strip part 33, a second projecting strip part 31, an annular groove part 32, a flat part 34 and a head mounting hole 38 which is formed in the flat part 34. These parts are arranged to surround the head 4. Cutout parts 35 and 36 are formed on the downstream side D of the pad 30. The head 4 is secured by means of an adhesive 39 to the inside of the head mounting hole 38 with the tip of the head 4 protruding further than the upper end of the projecting strip part 33 by scores of $\mu$m. The pad 30 is thus arranged to prevent any leak of air to ensure a stable state of negative pressure. The upper end sides of the second and first projecting strip parts 31 and 33 are formed aslant to have angles of inclination $\theta 2$ and $\theta 1$, respectively, as shown in FIG. 3.

With the pad 30 arranged in this manner, when the sheet 3 is rotated by the motor 10, there arises an air stream according to the rotation of the motor 10. The air stream brings forth negative pressure between the sheet 3 and the groove part 32 and the flat part 34 of the pad 30. The negative pressure acts to suck the sheet 3 toward the pad 30. This sucking force brings the sheet 3 into contact with the head 4 with a constant amount of pressure. Under this condition, even if the pressure in the pad 30 is changed by some disturbance or vibrations of the sheet 3, the cutout parts 35 and 36 act to keep the pressure in a balanced state by allowing an inflow or outflow of air. Therefore, the pressure between the pad 30 and the sheet 3 can be kept in a constant state as long as the rotational frequency of the motor 10 remains constant. A contact state between the head 4 and the sheet 3 then also remains constant to give an adequate head touch characteristic.

Under the above-stated condition, the sheet 3 is deformed in a natural manner along the sliding-contact faces 31a and 33a of the projecting strip parts 31 and 33. The possibility of the partial contact which has resulted from the conventional arrangement thus can be minimized by the embodiment of this invention. In other words, when the sheet 3 comes into contact with the pad 30, the embodiment gives a greater positive pressure than the conventional device on the upstream side U of the pad 30, so that the contact force of the sheet 3 on the pad 30 is lowered accordingly. Meanwhile, on the downstream side D, the arrangement to form the sliding-contact faces 31a and 33a of the projecting strip parts 31 and 33 in a tapered shape weakens the positive pressure between the sheet 3 and the sliding-contact faces 31a and 33a of the pad 30. The thus weakened positive pressure allows the sheet 3 to be sufficiently sucked toward the pad 30 by the negative pressure developed at the groove part 32 and the flat part 34. As a result, the sheet 3 is deformed symmetrically with respect to the center of the head 4 when the gap part of the head 4 comes into contact with the sheet 3. The symmetric contact not only improves the head touch characteristic but also reduces the partial abrasion of the head 4.

Figure 4A:
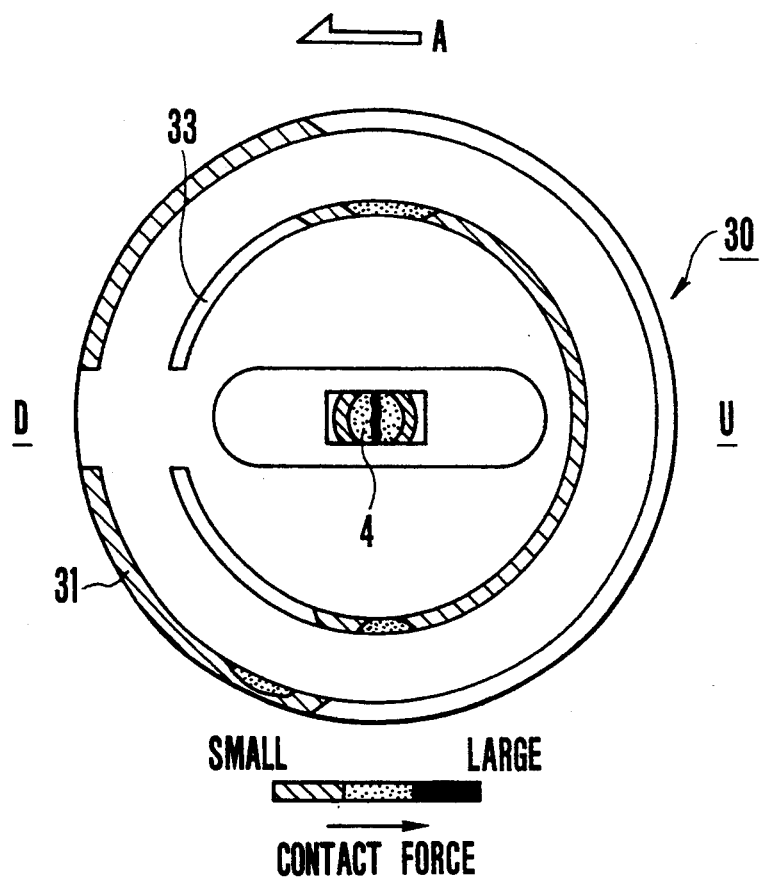
FIGS. 4(a) and 4(b) show contact force distribution between a sheet-shaped recording medium and a pad, FIG. 4(a) showing the contact force distribution obtained by the embodiment of the invention and FIG. 4(b) showing the contact force distribution obtained by the conventional pad.
Figure 4B:
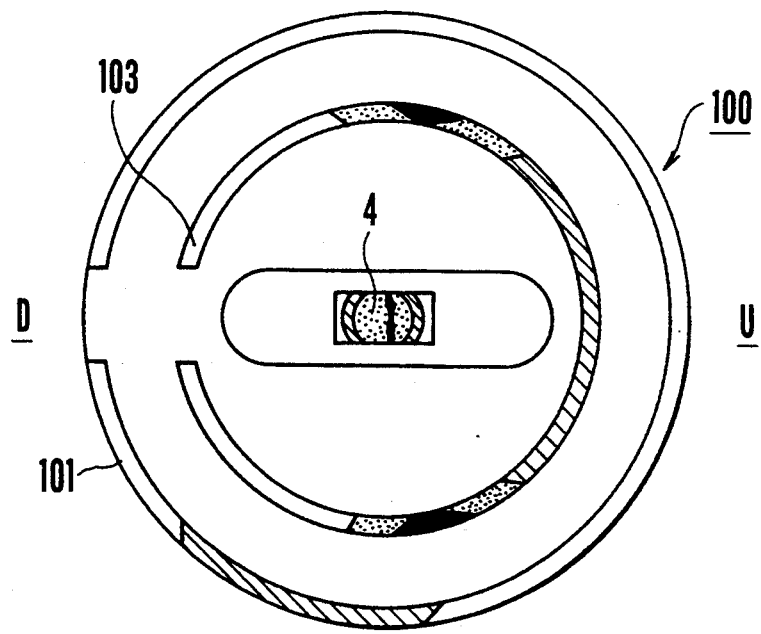
Figure 5A:
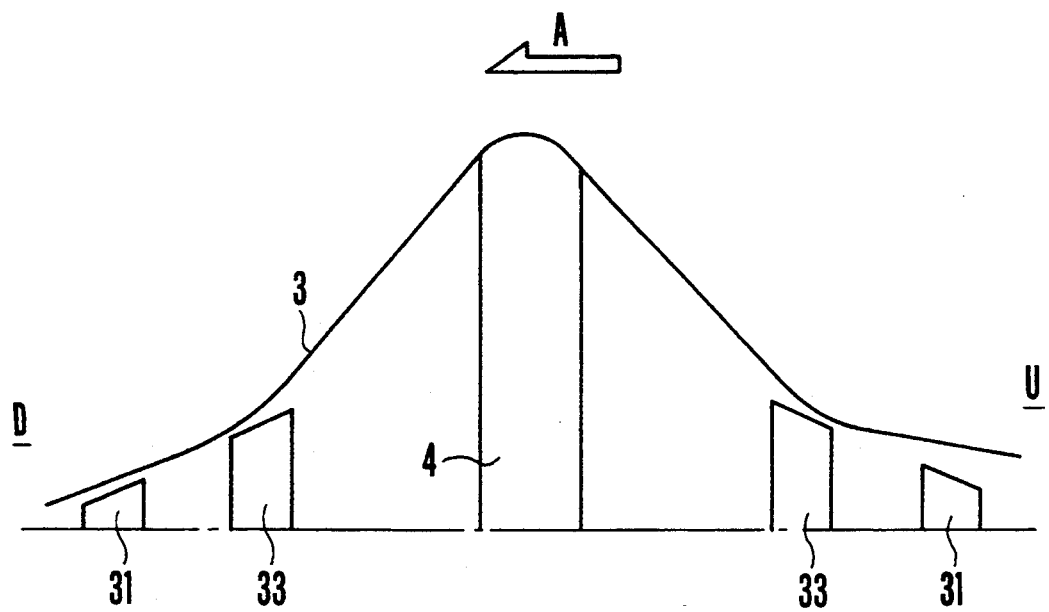
FIGS. 5(a) and 5(b) show the deformation of a sheet-shaped magnetic recording medium taking place when the sheet-shaped recording medium is sucked, FIG. 5(a) showing a deformation caused by the embodiment and FIG. 5(b) showing the deformation caused by the conventional device.
Figure 5B:
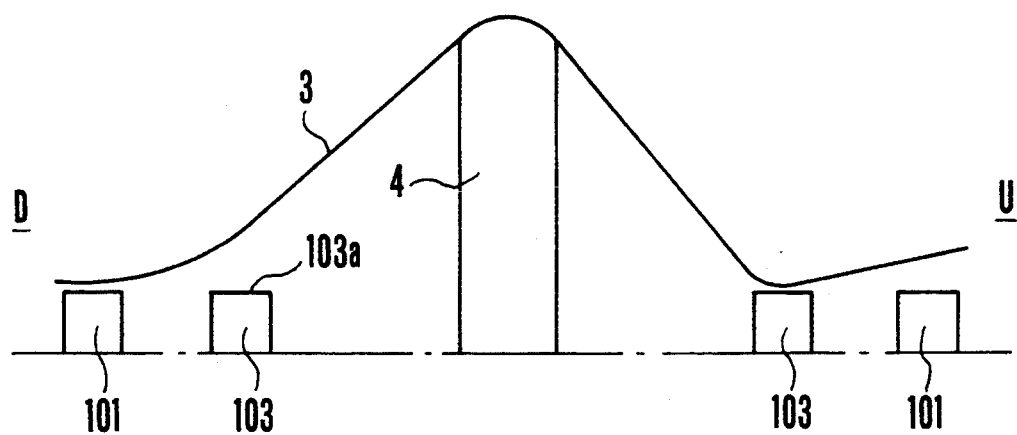

FIGS. 4(a), 4(b), 5(a) and 5(b) show the results of simulation tests of the above-stated concept made in respect to fluidics and strength of materials. FIGS. 4(a) and 4(b) show the distribution of the contact force between the sheet 3 and the pad 30. FIGS. 5(a) and 5(b) are enlarged illustrations of the deformation in the deforming direction of the sheet 3. Of these figures, FIGS. 4(b) and 5(b) show the results of simulation made for the conventional device, and FIGS. 4(a) and 5(a) show the results of simulation made for the embodiment, with the angles of inclination of the sliding-contact faces 33a and 31a assumed to be $\theta 1 = \theta 2 > 0$.

According to the result of simulation shown in FIG. 4(b), the pad 100 strongly touches the radially outer and inner sides of the sheet 3 (upper and lower sides of the figure on the outer side of the projecting strip part 103. It has been ascertained through tests that the probability of the occurrence of damage at the above-stated parts of the sheet 3 is high.

Whereas, in the case of the result of simulation shown in FIG. 4(a), the contact of the projecting strip part 33 with the sheet 3 is much more moderate. Meanwhile, the contact force is strong on the downstream side D on the inner side of the projecting strip part 31 and also is strong on the radially inner side of the sheet 3 (lower side of the figure). This result suggests that a better result is obtainable by setting the angle of inclination $\theta 2$ of the projecting strip part 31 at a smaller angle than the angle of inclination $\theta 1$ of the projecting strip part 33. Considering these things, the angles of inclination $\theta 1$ and $\theta 2$ should be in the following relation:

$$\theta 1 > \theta 2 > 0 \text{ or } \theta 1 > \theta 2 > 0$$

The sheet 3 is apt to be damaged at its parts where the contact forces of the projecting strip parts 31 and 33 are strong. Therefore, the edges of the projecting strip parts 31 and 33 are preferably chamfered to a very small extent (scores of $\mu m$). These edges can be chamfered as desired by polishing the sliding-contact faces of the pad 30 through a flexible matter such as leather.

With respect to the head 4 shown in FIG. 4(b), the sheet 3 strongly touches the head 4 at a point on the upstream side U relative to the head 4. Hence, partial abrasion (wear) and an inadequate head touch tend to occur around this point. Whereas, in the case of FIG. 4(a), the sheet 3 strongly touches the central part of the head 4. In this case, therefore, the head 4 evenly wears away relative to the gap part of the head 4 to ensure an adequate head touch characteristic.

Referring now to FIGS. 5(a) and 5(b), in accordance with the conventional pad arrangement, the sheet 3 is away from the sliding-contact face 103a of the pad 100 on the downstream side D, as shown in FIG. 5(b). In the case of the conventional pad, therefore, the deformation of the sheet 3 becomes asymmetric to cause the partial abrasion of the head 4. Whereas, in the case of the pad arrangement of the embodiment of this invention, the sheet 3 is deformed nearly symmetrically relative to the head 4 on both the upstream and downstream sides U and D of the pad 30, as shown in FIG. 5(a). Therefore, the head 4 can be prevented from partially wearing.

In the case of this embodiment, the angles of inclination $\theta 2$ and $\theta 1$ of the sliding-contact faces 31a and 33a are arranged to be equal to each other. However, these angles may be arranged to be different from each other according to the distribution of pressure.

As apparent from the foregoing description, the sliding-contact faces 33a and 31a of the first and second projecting strip parts 33 and 31 of the pad 30 are formed to be slanting upward toward the head 4. Therefore, the local contact forces of the sheet 3 on the head 4 and the pad 30 can be lowered and applied to their points which are symmetrically located. Therefore, the sheet 3 can be prevented from being damaged; jitters can be lessened; and the head 4 can be saved from partial abrasion. The arrangement of the embodiment thus greatly enhances the reliability and the durability of the apparatus.

Figure 6A:
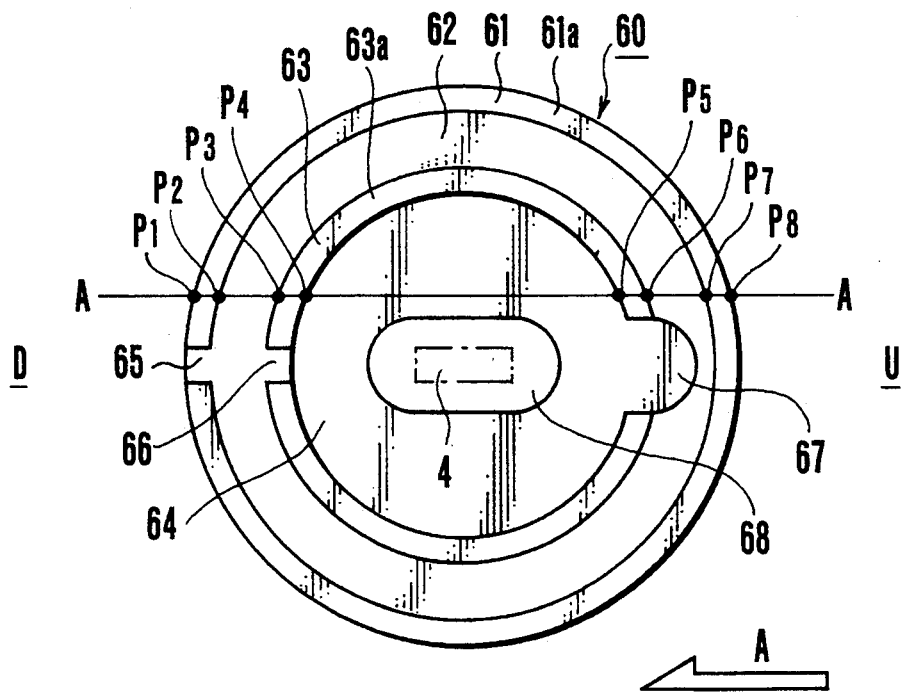
FIGS. 6(a) and 6(b) are a plan view and a sectional view showing another embodiment of the invention.
Figure 6B:
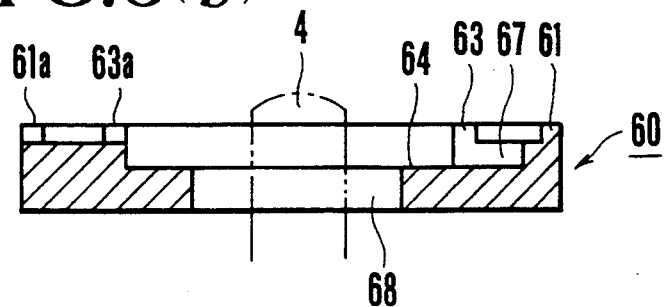

In the embodiment described above, such parts of the pad 30 that tend to damage the sheet 3, i.e., the edges of the projecting strip parts 31 and 33, are slightly chamfered for preventing the sheet 3 from being damaged. Whereas, in another embodiment of this invention, this purpose is attained by more positively defining the edge shapes of the projecting strip parts as described below:

FIGS. 6(a) and 6(b) show by way of example how the shape of the ridge lines of the projecting strip parts of the pad is defined. FIG. 6(a) shows the example in a plan view and FIG. 6(b) in a sectional view as taken along a center line of FIG. 6(a). The pad 60 is disposed around the magnetic head 4 and has a flat part 64 formed on one side of the pad 60 facing the magnetic sheet 3 (see FIG. 2). A slot (or hole) 68 is arranged in the middle part of the flat part 64 to allow the head 4 to be inserted therethrough. Concentric circular projecting strip parts 61 and 63 which protrude to a given height from the flat part 64 are spaced a given distance across an annular groove part 62. Cutout parts 65 and 66 which are arranged to eject an air stream generated by the rotation of the sheet 3 for controlling negative pressure developed by the pad 60 are formed at parts located on the downstream side D relative to the moving direction of the sheet 3 indicated by an arrow A. Further, another cutout part 67 is formed in the projecting strip part 63 by cutting the projecting strip part 63 from its upper surface side down to a part which is at the same height as the flat part 64.

Figure 7:
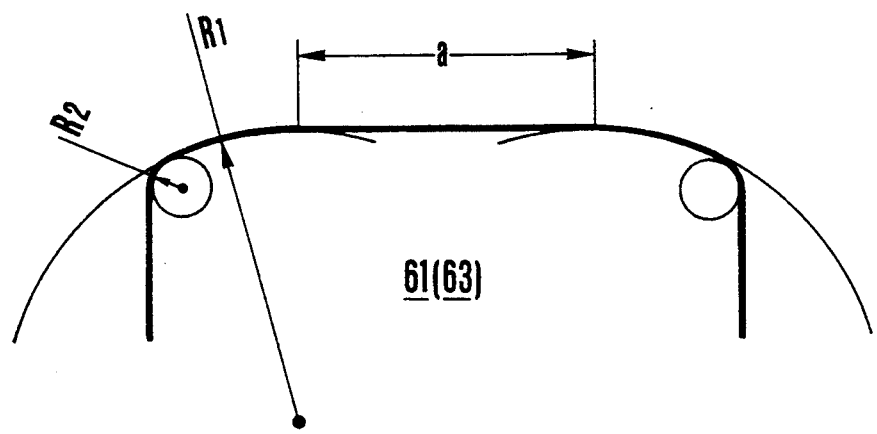
FIG. 7 shows the main part of the sectional shape of the projecting strip part according to the embodiment.

FIG. 7 shows the sectional shape of the sliding contact faces of the projecting strip parts 61 and 63 of the pad 60 which come into sliding contact with the sheet 3. This shape consists of a straight line and a plurality of circular arcs. In the case of the pad 60 of this embodiment, the straight line part is located in the middle part "a". The both ends of the straight line part is moderately connected to circular arcs of a radius R1. Each of the arcs is further connected to an arc of a radius R2 smaller than R1. In the case of this embodiment, R1:R2=10:1.

The middle straight line part "a" may be replaced with an arc having a much greater radius than the radius R1 or R2.

Figure 8A:
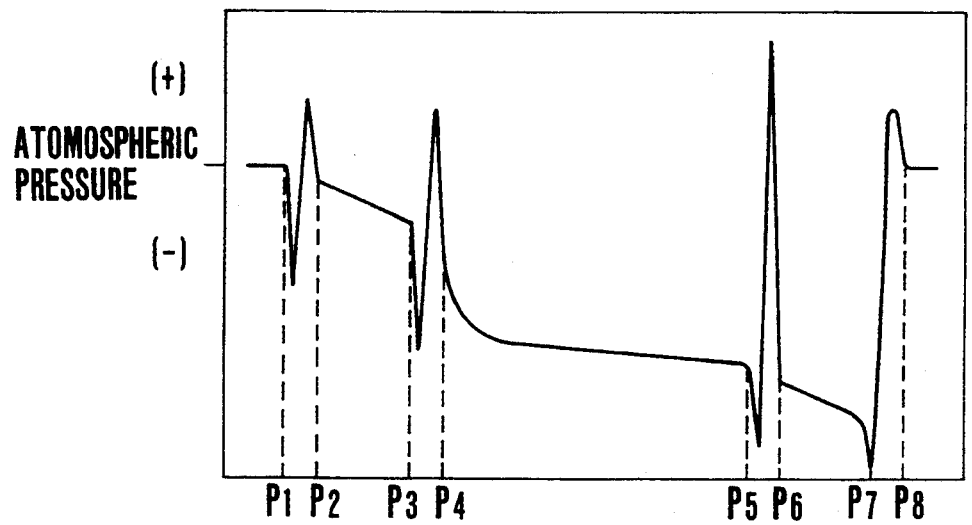
FIGS. 8(a) and 8(b) show distribution of pressure obtained between the sheet and the pad, FIG. 8(a) showing the pressure distribution obtained by the embodiment and FIG. 8(b) showing the pressure distribution obtained by the conventional device.
Figure 8B:
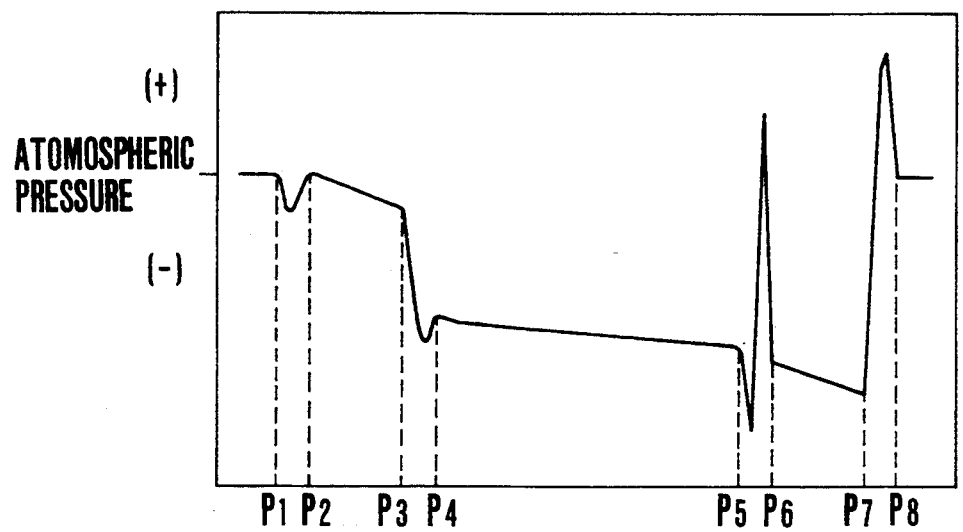
Figure 9A:
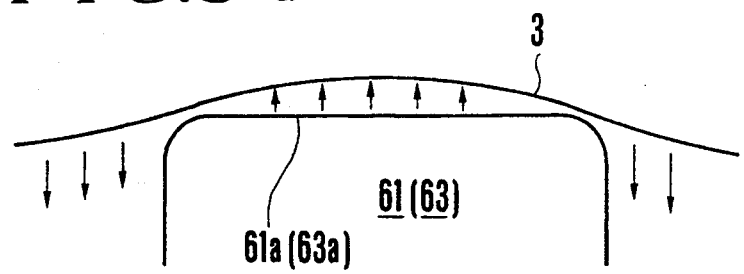
FIGS. 9(a) and 9(b) show sheet-sucking states obtained at projecting strip parts of the pads, FIG. 9(a) showing a sheet-sucking state obtained by the embodiment and FIG. 9(b) showing a sheet-sucking state obtained by the conventional device.
Figure 9B:
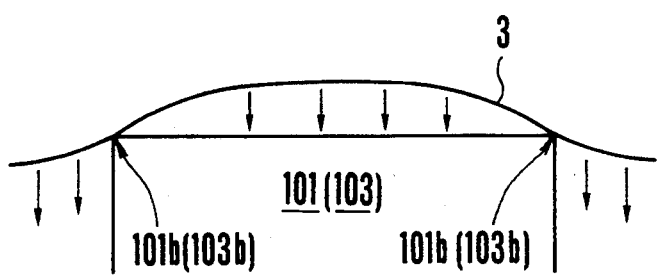

With this pad 60 arranged around the head 4, when the sheet 3 is rotated, an air stream is brought forth by the rotation of the sheet 3 between the pad 60 and the sheet 3. The air stream then generates negative pressure which acts to suck the sheet 3. FIG. 8(a) shows the results of a fluidic analysis of pressure distribution thus obtained between the pad 60 and the sheet 3. The pressure distribution shown in FIG. 8(a) is obtained along a straight line A—A shown in FIG. 6(a). Points P1 to P8 shown in FIG. 8(a) correspond to points P1 to P8 shown in FIG. 6(a). This pressure distribution clearly shows that, at the parts corresponding to the sliding-contact faces 61a and 63a which come into sliding contact with the sheet 3, positive pressure is generated both on the upstream side U and the downstream side D with respect to the rotation of the sheet 3. The sheet 3 is sucked by the negative pressure generated at the groove part 62 and the flat part 64 and is adequately brought into contact with the head 4 to give an adequate head touch. Meanwhile, at the sliding-contact faces 61a and 63a of the projecting strip parts 61 and 63, positive pressure brings about a buoyant force, which prevents the sheet 3 from coming into contact with these sliding-contact faces 61a and 63a, as shown in FIG. 9(a).

Figure 10:
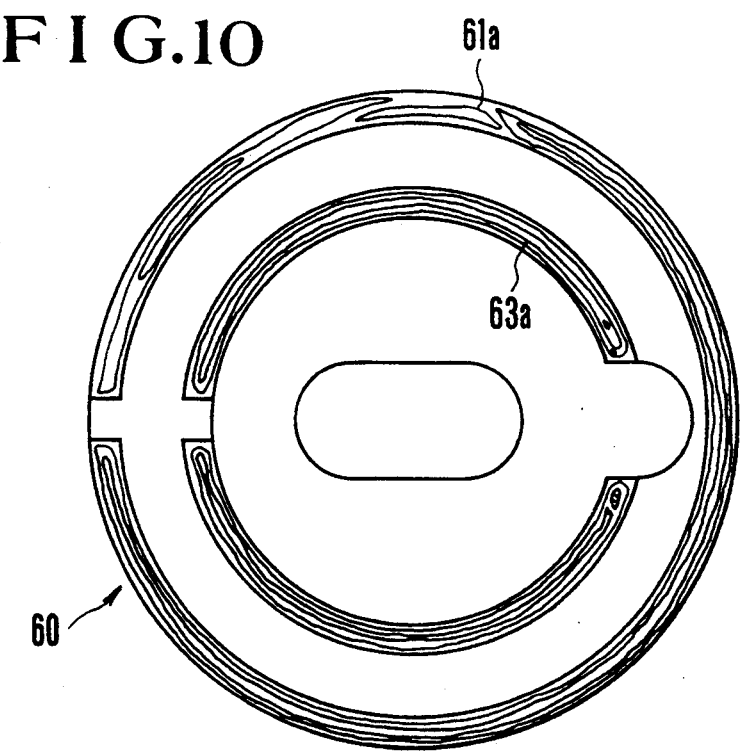
FIG. 10 shows the distribution of a contact force obtained by the embodiment between the projecting strip parts of the pad and the sheet-shaped magnetic recording medium.

FIG. 10 shows the results of an analysis of the state of contact of the sheet 3 with the whole pad 60. As apparent from FIG. 10, in the case of the pad 60, the sheet 3 is almost evenly touching the whole sliding contact faces 61a and 63a of the projecting strip parts 61 and 63.

In the case of this embodiment, as apparent from the foregoing description, the sectional shape of each of the projecting strip parts 61 and 63 of the pad 60 consists of a nearly straight line part which is located on the side facing the sheet 3; and a plurality of arcs which continue from both ends of the nearly straight line part. Further, each of these arcs is formed to be consisting of a first arc which is of a radius R1 and continues from the nearly straight line part; and a second arc which is of a radius R2 and continues from the first arc. The radius R1 is arranged to be larger than the radius R2. This shape effectively reduces a sliding-contact resistance between the sheet 3 and the pad 60, so that a load on the spindle motor can be lessened and the motor can be prevented from unevenly rotating.

Further advantages of the embodiment include, among others: the recording medium is not damaged; and an adequate head touch is obtainable. Therefore, the reliability of the recording or reproducing apparatus can be enhanced and energy can be saved.

This embodiment has been described as being arranged to have the inner projecting strip part 63 and the outer projecting strip part 61 on the same plane for the sake of facilitating the description. However, a synergetic effect can be attained by a combination of the arrangement of this embodiment and that of the embodiment first described in the foregoing to give a still better recording or reproducing apparatus.

What is claimed is:

1. An apparatus for recording or reproducing information on or from a sheet-shaped recording medium with the recording medium loaded thereon, comprising:
   a) a head for recording or reproducing the information on or from the recording medium; and
   b) a head-supporting part for providing a negative pressure to suck said recording medium to said head, said head-supporting part including a first projecting part which surrounds and is spaced from said head and protrudes on one side of said head-supporting part facing the recording medium and a second projecting part which is concentric with and on the outer side of said first projecting part and also surrounds said head, said first projecting part being spaced from said second projecting part to define a spacing part therebetween, wherein faces of said first and second projecting parts facing the recording medium are slanted upward toward said head.

2. An apparatus according to claim 1, wherein, where an angle of inclination of the slanting face of said first projecting part is assumed to be $\theta 1$ and an angle of inclination of the slanting face of said second projecting part is assumed to be $\theta 2$, the angles $\theta 1$ and $\theta 2$ satisfy the following relation:

$$\theta 1 > \theta 2 > 0 \text{ or } \theta 1 > \theta 2 > 0$$

3. An apparatus according to claim 1, wherein a sectional shape of each of said first and second projecting parts is composed of an approximately straight line which is located on one side of said head-supporting part facing the recording medium and a plurality of arcs which continue respectively from two ends of said approximately straight line.

4. A head supporting device for causing a sheet to abut on a head by sucking the sheet with negative pressure, comprising:
   a) a first projecting part which surrounds and is spaced from the head and protrudes from one side of said head supporting device facing the sheet; and
   b) a second projecting part being concentric with and on the outer side of said first projecting part and also surrounds said head, said first projecting part being spaced from said second projecting part to define a spacing part therebetween, wherein faces of said first and second projecting parts facing the sheet are slanted upward toward the head.

5. A device according to claim 4, wherein, where an angle of inclination of the slanting face of said first projecting part is assumed to be $\theta 1$ and an angle of inclination of the slanting face of said second projecting part is assumed to be $\theta 2$, the angles $\theta 1$ and $\theta 2$ satisfy the following relation:

$$\theta 1 > \theta 2 > 0 \text{ or } \theta 1 > \theta 2 > 0$$

6. A device according to claim 4, wherein said sheet is a magnetic sheet.

7. A device according to claim 6, wherein said head is a magnetic head for recording or reproducing information on or from the magnetic sheet.

8. A device according to claim 4, wherein said first and second projecting parts are respectively formed in ring-like shapes.

9. A device according to claim 4, wherein said first and second projecting parts are respectively provided with cutout parts for providing communication between a region on an inner side of said first projecting part and a region on an outer side of said second projecting part.

10. A device according to claim 9, wherein said first projecting part is further provided with another cutout part for providing communication between a region on the inner side of said first projecting part and said spacing part.

11. A device according to claim 10, wherein the two cutout parts formed in said first projecting part are located in positions opposite to each other.

12. A device according to claim 4, wherein a sectional shape of each of said first and second projecting parts is composed of an approximately straight line which is located on one side of said device facing the sheet and a plurality of arcs which continue respectively from two ends of said approximately straight line.

13. An apparatus for recording or reproducing information on or from a sheet-shaped recording medium by moving a head and the recording medium relative to each other, comprising:

a stabilizing member surrounding the head and generating pressure for causing the recording medium to abut on the head when the recording medium and the head are moved relative to each other, said stabilizing member having a plurality of projecting parts each having a face protruding on one side of said stabilizing member facing the recording medium and the plurality of projecting parts being concentric surrounding and spaced from the head, and a sectional shape of each projecting part being composed of an approximately straight line on the recording-medium-facing side and a plurality of arcs which continue respectively from two ends of said approximately straight line.

14. An apparatus according to claim 13, wherein said plurality of arcs continuing from the two ends of said approximately straight line include a first arc which is of a radius R1 and a second arc which is of a radius R2 and continues from said first arc, and wherein the radiuses R1 and R2 are in a relation of $R1 > R2$.

15. An apparatus according to claim 13, wherein said recording medium is a magnetic disc.

16. An apparatus according to claim 15, wherein said head is a magnetic head for recording or reproducing information on or from the magnetic disc.

17. A head supporting device for causing a sheet to be sucked by the action of negative pressure, comprising:
a plurality of projecting strip parts being concentric and surrounding a head and having a sectional shape of each projecting strip part being composed of an approximately straight line which is located on one side of said device facing the sheet and a plurality of arcs which continue respectively from two ends of said approximately straight line, the plurality of projecting strip parts being spaced from the head.

18. A device according to claim 17, wherein said plurality of arcs continuing from the two ends of said approximately straight line include a first arc which is of a radius R1 and a second arc which is of a radius R2 and continues from said first arc, and wherein the radiuses R1 and R2 are in a relation of $R1 > R2$.

19. A device according to claim 17, wherein said sheet is sucked and brought into contact with said head by the action of the negative pressure caused by said head supporting device.

20. A device according to claim 19, wherein said plurality of projecting strip parts includes a first projecting strip part and a second projecting strip part, said first projecting strip part being spaced from said second projecting strip part to define a spacing part therebetween.

21. A device according to claim 20, wherein said first projecting strip part is disposed on the inner side of said second projecting strip part.

22. A device according to claim 21, wherein said first and second projecting strip parts are respectively provided with cutout parts for providing communication between a region on an inner side of said first projecting strip part and a region on an outer side of said second projecting strip part.

23. A device according to claim 22, wherein said first projecting strip part is further provided with another cutout part for providing communication between a region on an inner side of said first projecting strip part and said spacing part.

24. A device according to claim 23, wherein the two cutout parts formed in said first projecting strip part are located in positions opposite to each other.

* * * * *

UNITED STATES PATENT AND TRADEMARK OFFICE
CERTIFICATE OF CORRECTION

PATENT NO. : 5,432,664
DATED : July 11, 1995
INVENTOR(S) : Yoshitaka Watanabe et al.

It is certified that error appears in the above-indentified patent and that said Letters Patent is hereby corrected as shown below:

Col. 5, line 16.  After "figure" insert -- ) --.

Col. 5, line 33.  Change " $>$ " to -- $\geq$ -- (first and fourth occurrences).

Col. 8, line 4.  Change " $>$ " to -- $\geq$ -- (first and fourth occurrences).

Col. 8, line 34.  Change " $>$ " to -- $\geq$ -- (first and fourth occurrences).

Signed and Sealed this

Seventeenth Day of October, 1995

BRUCE LEHMAN

Attest:

Attesting Officer

Commissioner of Patents and Trademarks